United States Patent
Andreen (10) Patent No.: US 12,251,863 B2
(45) Date of Patent: Mar. 18, 2025

(54) INJECTION MOULDING APPARATUS AND METHOD TO REDUCE VELOCITY INCREASE OF FLOW FRONT DURING INJECTION MOULDING

(71) Applicants: Ningbo Geely Automobile Research & Development Co., Ltd., Ningbo (CN); Zhejiang Geely Holding Group Co., Ltd., Zhejiang (CN)

(72) Inventor: Erik Andreen, Gothenburg (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 116 days.

(21) Appl. No.: 18/205,117

(22) Filed: Jun. 2, 2023

(65) Prior Publication Data
US 2023/0330903 A1    Oct. 19, 2023

Related U.S. Application Data (63) Continuation of application No. PCT/CN2021/133081, filed on Nov. 25, 2021.

(30) Foreign Application Priority Data

Dec. 16, 2020   (EP) .................................. 20214698

(51) Int. Cl.
B29C 45/27        (2006.01)
(52) U.S. Cl.
CPC ............................. *B29C 45/2708* (2013.01)

(58) Field of Classification Search
CPC ............ B29C 45/0046; B29C 45/2708; B29C 2045/0032
See application file for complete search history.

(56) References Cited

U.S. PATENT DOCUMENTS

| 6,063,315 A | 5/2000 | Keller |
| 2004/0130062 A1 | 7/2004 | Sicilia |
| 2011/0293774 A1 | 12/2011 | Scheffer |

(Continued)

FOREIGN PATENT DOCUMENTS

| CN | 202016175 U | 10/2011 |
| CN | 202781678 U | 3/2013 |
| CN | 202781679 U | 3/2013 |

(Continued)

OTHER PUBLICATIONS

International Search Report from corresponding International Application No. PCT/CN2021/133081, mailed on Feb. 22, 2022, 2 pages.

*Primary Examiner* — James Sanders
(74) *Attorney, Agent, or Firm* — Tucker Ellis LLP (57) ABSTRACT

An injection moulding apparatus including at least a first mould plate, the first mould plate having a first injection inlet arranged in fluid connection with a first gate leading into a mould cavity and a second injection inlet arranged in fluid connection with a second gate leading into the mould cavity. The first and second injection inlets are arranged to open in sequence. The second gate includes a first gate volume leading into the mould cavity. The second gate is further provided with a second gate volume allowing injection material to flow into the second gate volume at the same time as into the first gate volume and thereafter into the mould cavity.

8 Claims, 6 Drawing Sheets

(56) References Cited

U.S. PATENT DOCUMENTS

2014/0232044 A1 8/2014 Herbst
2016/0214300 A1 7/2016 Bazzo

FOREIGN PATENT DOCUMENTS

| CN | 103640152 | A | 3/2014 |
| CN | 111730818 | A | 10/2020 |
| JP | H06238706 | A | 8/1994 |
| JP | 2665112 | B2 | 10/1997 |
| JP | 2000254946 | A | 9/2000 |

INJECTION MOULDING APPARATUS AND METHOD TO REDUCE VELOCITY INCREASE OF FLOW FRONT DURING INJECTION MOULDING

RELATED APPLICATION DATA

This application is a continuation of International Patent Application No. PCT/CN2021/133081, filed Nov. 25, 2021, which claims the benefit of European Patent Application No. 20214698.1, filed Dec. 16, 2020, the disclosures of which are incorporated herein by reference in their entireties.

TECHNICAL FIELD

The disclosure relates to an injection moulding apparatus and a method for reducing a velocity increase of a flow front during injection moulding.

BACKGROUND

Injection moulding is a well-known plastic moulding technique that is used to mould plastic parts of many shapes and sizes. When injection moulding large details, today's injection moulding apparatuses use several inlets that open in sequence, with injection of the liquid plastic often starting in the middle of the detail.

When the second intake is opened during the filling phase, a velocity increase at the flow front of the injected liquid plastic is experienced in connection to the second intake. This velocity increase is undesirable as it affects the final quality of the injection moulded detail. A too high velocity change on the flow front will result in a surface deformation on the detail that can be visible after painting.

One way to address this issue is to use intakes that are opened step by step (see link https://www.synventive.com/products/active-gate-control.aspx). However, these intakes are both expensive and take a lot of time to install.

There is thus a need for an improvement over the previously known method of addressing increased velocity of the flow front during injection moulding.

SUMMARY

An objective of the disclosure is to provide an injection moulding apparatus and a method addressing the issues raised.

The disclosure relates to an injection moulding apparatus comprising at least a first mould plate. The first mould plate comprises a first injection inlet arranged in fluid connection with a first gate leading into a mould cavity and a second injection inlet arranged in fluid connection with a second gate leading into the mould cavity. The first injection inlet and the second injection inlet are arranged to open in sequence, with the first injection inlet opening before the second injection inlet. The second gate comprises a first gate volume leading into the mould cavity. The second gate is further provided with a second gate volume allowing injection material to flow into the second gate volume at the same time as into the first gate volume and thereafter into the mould cavity, thereby reducing the velocity of an injection flow in the mould cavity from the second gate.

By adding a second gate volume to the second gate in addition to the already present first gate volume that leads into the mould cavity, the increased volume acts as a shock absorber for the injected liquid plastic. The velocity increase on the flow front of the injected material from the second gate is reduced and is in some cases reduced all the way to zero.

Even though the injection moulding apparatus according to the disclosure is most beneficial during the filling phase, it has been shown to provide improvements also during the packing phase.

One further advantage with the injection moulding apparatus according to the disclosure is that it is possible to add the second gate volume to existing injection moulding apparatuses. Even though it increases the cost relative to if it is done during the design of an injection moulding apparatus, the cost will still be significantly lower than to use intakes that are opened step by step.

The second gate volume may be provided by a first increased volume extending from the second injection inlet in a first direction. The second gate volume can take many forms and in its least complex form extends in a first direction, for instance in a direction facing away from the direction that the second gate leads into the mould cavity.

The second gate volume may be further provided by a second increased volume extending from the second injection inlet in a second direction different from the first direction. If the second gate volume needs to be increased in a way where extending the second gate volume only in a first direction does not yield a large enough second gate volume, the second gate volume can be extended in a second direction different from the first direction. The second direction may be perpendicular to the first direction and extend in a horizontal or vertical direction relative the extension of the first direction. The second direction may alternatively extend in a direction at an angle smaller or greater than 90° to the first direction. The second gate volume may also extend in a both positive and negative second direction; an example would be if the second gate volume is essentially T-shaped.

The first and/or second increased volume may be in the shape of one or more of cuboids, spheroids, parallelepipeds or cylinders. Depending on the amount of space available in the in first mould plate, the first and/or second increased volume can take different shapes such that the desired second gate volume can be achieved. Various combinations of shapes can be used to achieve the desired second gate volume.

The second gate comprises a throttle leading into the first increased volume. The throttle will lead to that the flow velocity of liquid plastic into the second gate volume is reduced such that the second gate volume is not filled too quickly. If the second gate volume is filled too quickly, the effect of the second gate volume is reduced.

The throttle may have a cross sectional area between approximately ¼ and ¾ of a cross sectional area of the second gate volume where the throttle connects the first and second gate volumes. A cross sectional area of this size has been shown to provide desired fill velocities of the second gate volume. It is also desired that the material in the throttle hardens once the second gate volume is filled so as the second gate volume is not filled during the filling phase.

A size of the second gate volume is a function of the distance between the first injection inlet and the second injection inlet. Depending on the size and shape of the detail to be moulded, the injection inlets will have to be placed with different distances between them in order to achieve the desired filling and packing characteristics. When designing an injection moulding apparatus comprising a second gate volume according to the disclosure, the distance between the first and second injection inlets will determine the size, i.e. final volume of the second gate volume.

The disclosure also relates to a method for reducing a velocity increase of a flow front during injection moulding, wherein an injection moulding apparatus comprises at least a first mould plate, the first mould plate comprising a first injection inlet arranged in fluid connection with a first gate leading into a mould cavity and a second injection inlet arranged in fluid connection with a second gate leading into a mould cavity, wherein the first injection inlet and the second injection inlet are arranged to open in sequence, with the first injection inlet opening before the second injection inlet, wherein the second gate comprises a first gate volume leading into the mould cavity, wherein the method comprises:
   providing the second gate with a second gate volume allowing injection material to flow into the second gate volume at the same time as into the first gate volume and thereafter into the mould cavity, thereby reducing the velocity of an injection flow in the mould cavity from the second gate.

The method may also comprise:
   providing the second gate volume by providing a first increased volume extending from the second injection inlet in a first direction.

The method may also comprise:
   providing the second gate volume further by providing a second increased volume extending from the second injection inlet in a second direction different from the first direction.

The method may also comprise:
   providing the first and/or second increased volume with a shape of one or more of cuboids, spheroids, parallelepipeds or cylinders.

The method may also comprise:
   providing the second gate with a throttle leading into the first increased volume.

The advantages with the method are the same as for the injection moulding apparatus described above.

DETAILED DESCRIPTION OF EXAMPLE EMBODIMENTS

Figure 1:
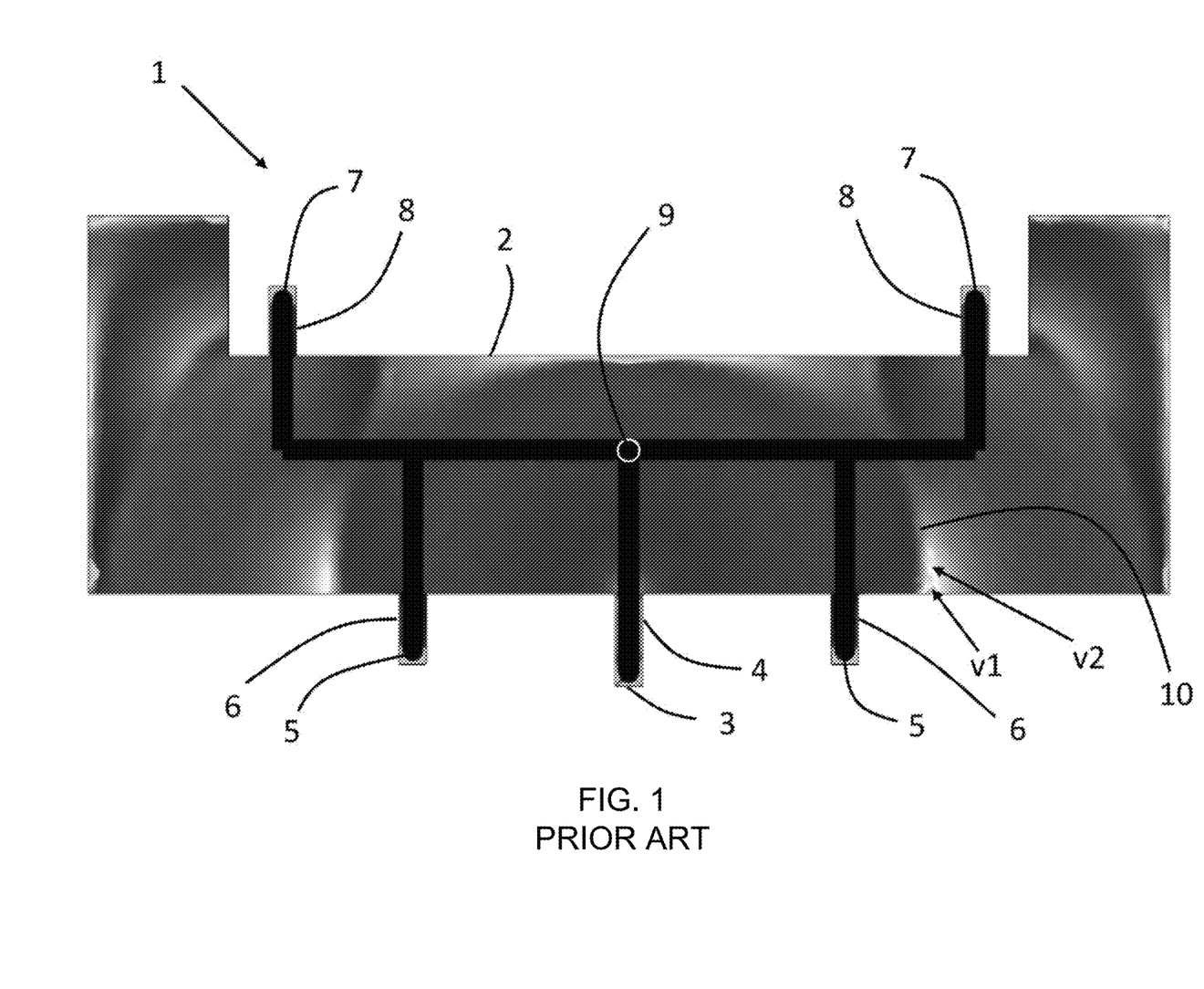
FIG. 1 schematically show a prior art injection moulding apparatus during filling of a mould cavity, FIG. 2 schematically show an injection moulding apparatus according to the disclosure during filling of a mould cavity, FIGS. 3A-3C schematically show a close-up view of a second gate volume according to embodiments of the disclosure, FIGS. 4A-4B schematically show various injection moulding apparatus gates during filling of a mould cavity.

FIG. 1 schematically show a prior art injection moulding apparatus 1 during filling of a mould cavity 2. The injection moulding apparatus 1 comprises a first mould plate and a second mould plate (not shown). The first mould plate comprises a first injection inlet 3 arranged in fluid connection with a first gate 4 leading into the mould cavity 2 and a second injection inlet 5 arranged in fluid connection with a second gate 6 leading into the mould cavity 2. The first injection inlet 3 and the second injection inlet 5 are arranged to open in sequence, with the first injection inlet 3 opening before the second injection inlet 5.

In FIG. 1, the mould cavity 2 has an example shape corresponding to a simplified bumper of a vehicle. The width of the bumper is approximately 1000 mm. The injection moulding apparatus 1 also comprises a third injection inlet 7 arranged in fluid connection with a third gate 8 leading into the mould cavity 2. The third injection inlet 7 is arranged to open in sequence after the first and second inlets 3, 5.

The first, second and third injection 3, 5, 7 inlets are provided with liquid plastic through runners 8 which in turn is supplied from a nozzle 9 as previously known in the art.

In the figure, the first injection inlet 3 has been open for some time and the second injection inlet 5 has recently opened. A flow front 10 is clearly visible in FIG. 1. A first velocity v1, measured at a wall of the mould cavity 2, and a second velocity v2, measured at a distance from the wall of the mould cavity 2 indicate a flow front velocity of the injected liquid plastic and illustrate a local velocity difference that may give rise to surface defect or flow marks on the article.

In FIG. 1, v1 is equal to approximately 57.1 cm/s and v2 is equal to approximately 45.8 cm/s.

Figure 2:
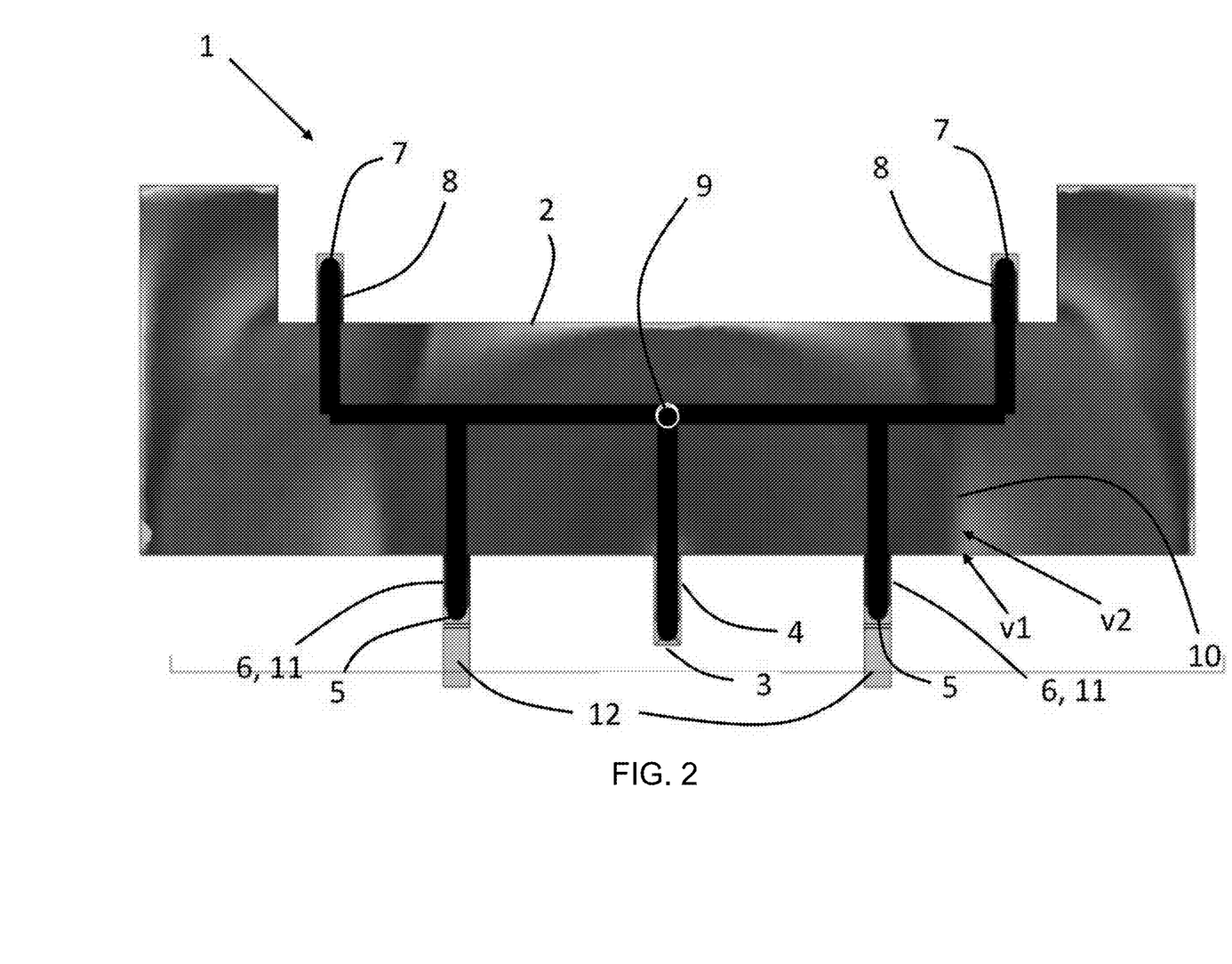

FIG. 2 schematically show an injection moulding apparatus 1 according to the disclosure during filling of a mould cavity 2. In FIG. 2, the difference from the injection moulding apparatus 1 of FIG. 1 is that the second gate 6 comprises a first gate volume 11 leading into the mould cavity 2 and the second gate 6 is further provided with a second gate volume 12 allowing injection material to flow into the second gate volume 12 at the same time as into the first gate volume 11 and thereafter into the mould cavity 2. This reduces the velocity of an injection flow in the mould cavity 2 from the second gate 6.

In FIG. 2, the first injection inlet 3 and the second injection inlet 5 has been opened in the same sequence and as for an equally long time as in FIG. 1. As in FIG. 1, a first velocity v1 is measured at the wall of the mould cavity 2, and a second velocity v2 is measured at a distance from the wall of the mould cavity 2 indicate a flow front velocity of the injected liquid plastic.

In FIG. 2, v1 is equal to approximately 23.3 cm/s and v2 is equal to approximately 21.7 cm/s. This clearly shows that the second gate volume 12 reduces the velocity of the injection flow of liquid plastic into the mould cavity 2 from the second gate 6 as well as the local velocity difference. The lower velocity at the flow front 10 reduces the risk of the injection moulded article, e.g. the bumper according to the example of FIGS. 1 and 2, from obtaining surfaces that do not meet the desired visual appearance of the article or surfaces that are deformed due to that liquid plastic enters the mould cavity 2 at a too high velocity.

The final volume of the second gate volume is a function of the distance between the first injection inlet 3 and the second injection inlet 5. If the first and second injection inlets 3, 5 are not situated in the same plane, the distance is measured as the radius of a sphere with the first injection inlet 3 placed in the centre of the sphere and the second injection inlet 5 situated on the surface of the sphere.

Figure 3A:
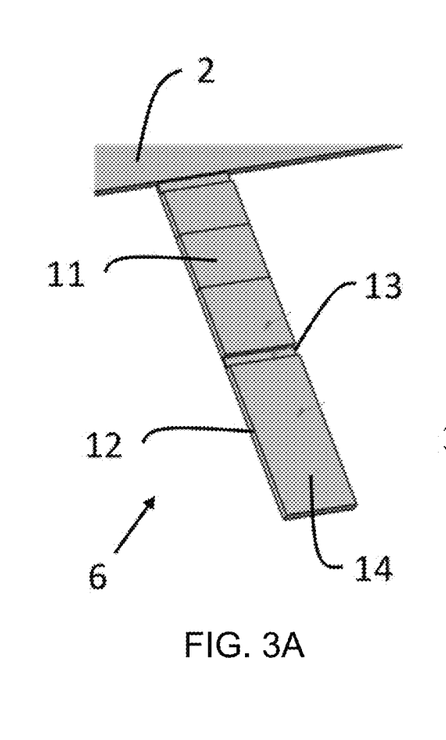
Figure 3B:
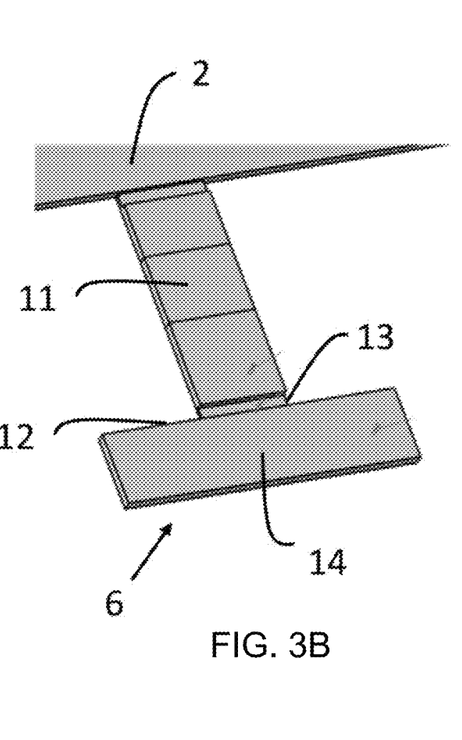
Figure 3C:
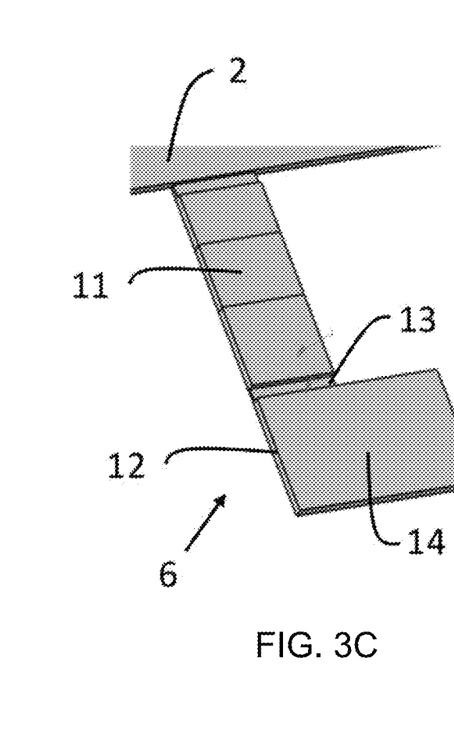

FIGS. 3A-3C schematically show a close-up view of a second gate volume 12 according to embodiments of the disclosure. In FIG. 3A, the second gate 6 comprising a throttle 13 and the second gate volume 12 as seen in FIG. 2 is shown. The second gate volume 12 is provided by a first increased volume 14 extending from the second injection inlet 5 in mainly a first direction, where the first direction is essentially extending in the same direction as the extension of the second gate 6.

In FIG. 3B, the second gate volume 12 is provided by a first increased volume 14 extending from the second injection inlet 5 in mainly a first direction, where the first direction is perpendicular to the extension of the second gate 6.

In FIG. 3C, the second gate volume 12 is provided by a first increased volume 14 extending in both a first and a second direction, where the first direction is essentially extending in the same direction as the extension of the second gate 6 and where the second direction is perpendicular to the extension of the second gate 6.

It is also possible to have the second gate volume 12 being provided by a second increased volume extending from the second injection inlet 5 in a second direction different from the first direction in addition to the first increased gate volume. For instance, combining the shapes of the first increased volume 14 of FIGS. 3A and 3B could result in a second gate volume 12 having a T-shape. Depending on the amount of space in the first injection mould plate or where otherwise suitable, the second gate volume 12 in the shape of one or more of cuboids, spheroids, parallelepipeds or cylinders.

The throttle 13 in FIGS. 3A-3C will lead to that the flow velocity of liquid plastic into the second gate volume 12 is reduced such that the second gate volume 12 is not filled too quickly. If the second gate volume 12 is filled too quickly, the effect of the second gate volume 12 is reduced.

The throttle 13 may have a cross sectional area between approximately 25% and 75% of a cross sectional area of the second gate volume 12 where the throttle 13 connects the first and second gate volumes 11, 12. A cross sectional area of this size has been shown to provide desired fill velocities of the second gate volume 12. It is also desired that the material in the throttle 13 hardens once the second gate volume 12 is filled so as the second gate volume 12 is not filled during the filling phase.

In the example of FIGS. 3A-3B, the first and second gate volumes 11, 12 are essentially cuboid in shape and have a height of approximately 3 mm. The throttle 13 has a height of approximately 1 mm resulting in a cross sectional area of 33% of a cross sectional area of the second gate volume 12 where the throttle 13 connects the first and second gate volume 11, 12. The effect of the throttle 13 is improved if the width of the throttle 13 is not wider than a width of the first gate volume 11. The interface between the second gate 6 and the mould cavity 2 is not changed.

Examples of the height of the throttle is between approximately 0.5-2 mm. The throttle also has an extension in the same direction as the first gate volume 11. Examples of the extension of the throttle is between approximately 2-5 mm. Example lengths of the second gate volume in FIG. 3A is between 50-70 mm, with approximately 60 mm being a good starting point for finding the proper design length.

The throttle is intended to be situated as close to the second injection inlet as possible to design and manufacture.

Figure 4A:
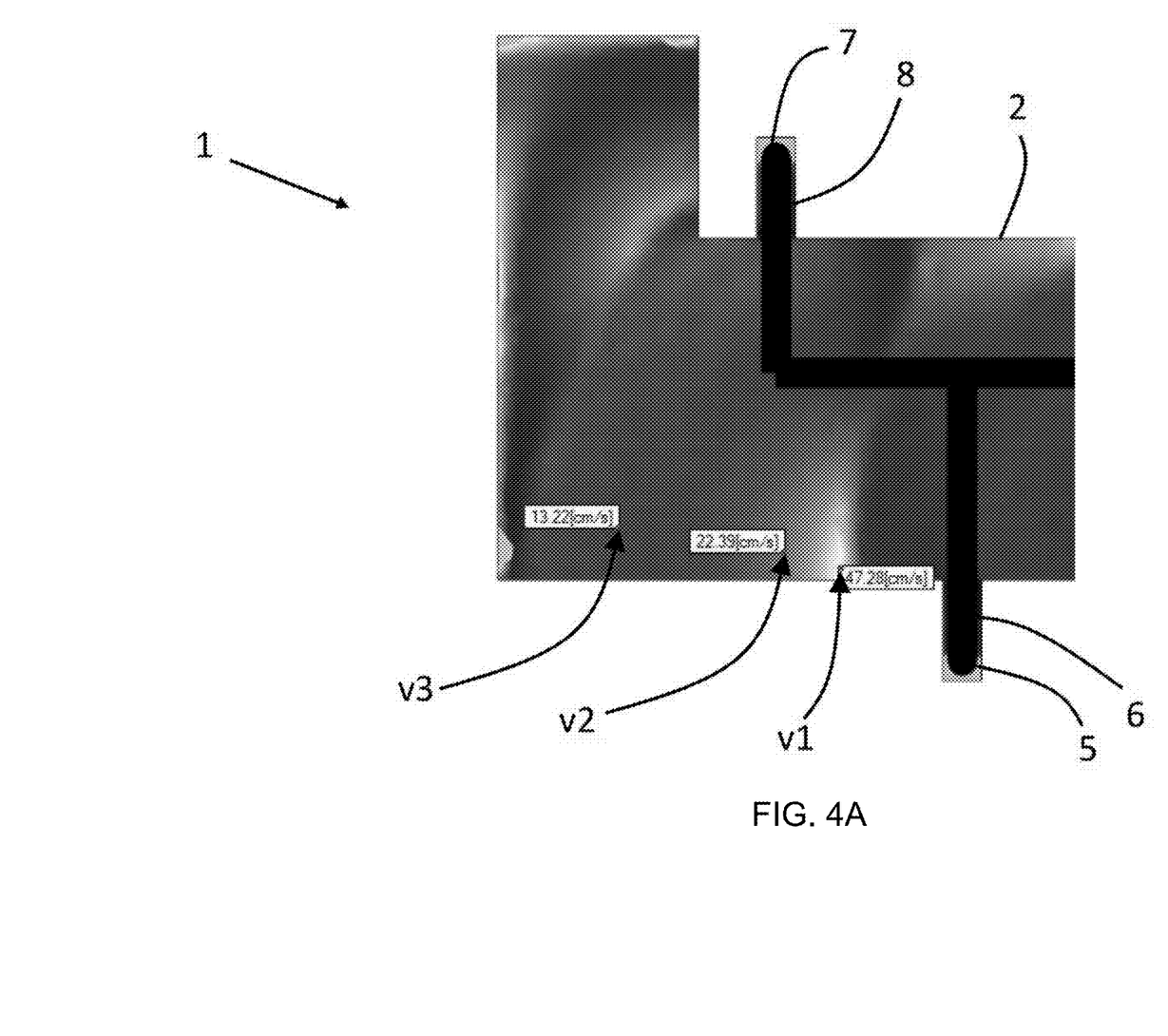
Figure 4B:
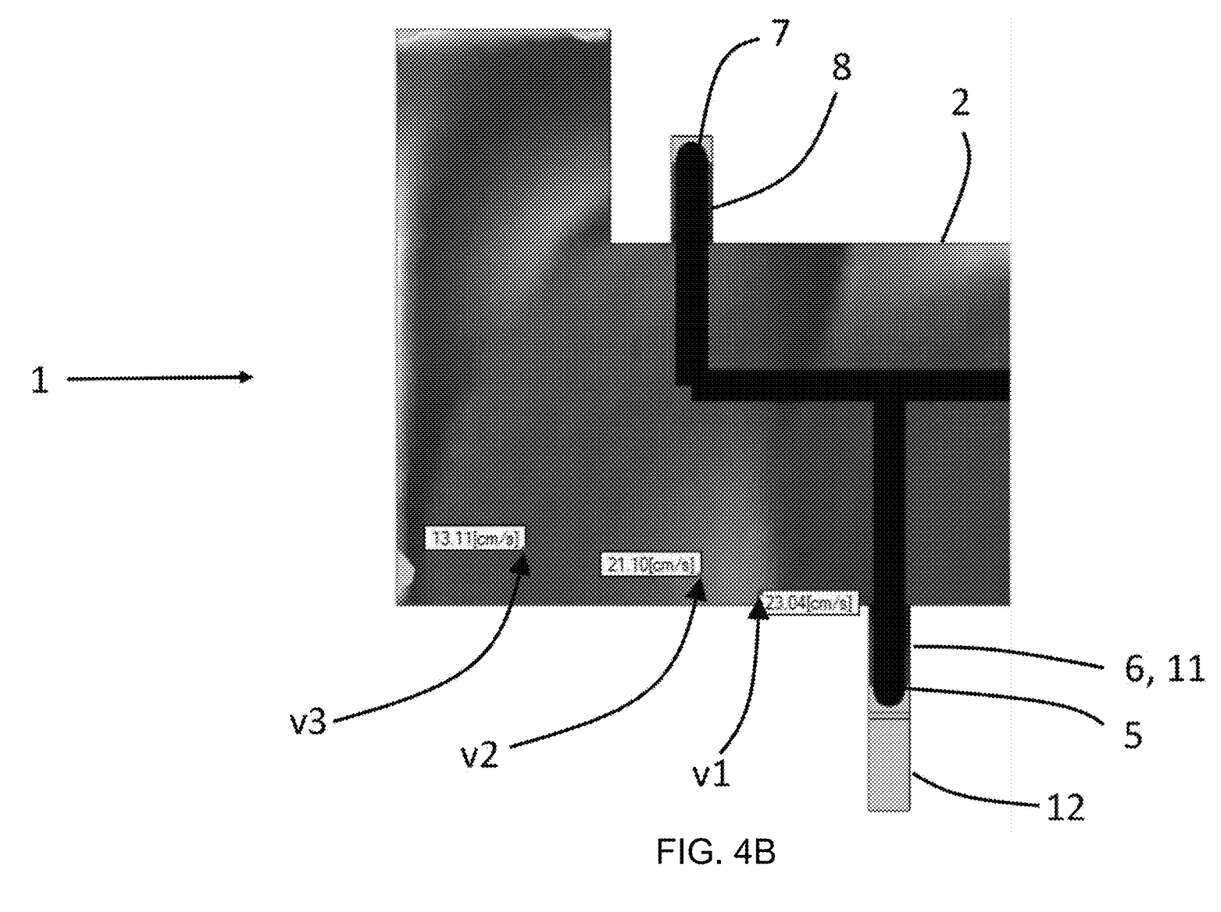

FIGS. 4A-4B schematically show a more detailed view of flow velocities for the injection moulding apparatus 1 of FIGS. 1 and 2 during filling of a mould cavity 2.

FIG. 4A schematically shows a more detailed view of flow velocities for the injection moulding apparatus 1 of FIG. 1. The velocity is indicated at three locations in the mould cavity 2, a first velocity v1 at the flow front 10 near the second gate 6 where the velocity is highest, a second velocity v2 at a first distance from the flow front 10 and a third velocity v3 at a second distance from the flow front 10. In FIG. 4A, the first velocity v1 is approximately 47.3 m/s, the second velocity v2 is approximately 22.4 m/s and the third velocity v3 is approximately 13.2 m/s.

FIG. 4B schematically shows a more detailed view of flow velocities for the injection moulding apparatus 1 of FIG. 2 comprising a second gate 6 provided with a second gate volume 12. The velocity is measured at three locations in the mould cavity 2, a first velocity v1 at the flow front near the second gate 6, a second velocity v2 at a first distance from the flow front 10 and a third velocity v3 at a second distance from the flow front 10. In FIG. 4A, the first velocity v1 is approximately 23.0 m/s, the second velocity v2 is approximately 21.1 m/s and the third velocity v3 is approximately 13.1 m/s. This clearly shows that the second gate volume 12 provides the desired effect of decreasing the flow front velocity while at the same time not reducing the quality of the injection.

Figure 5A:
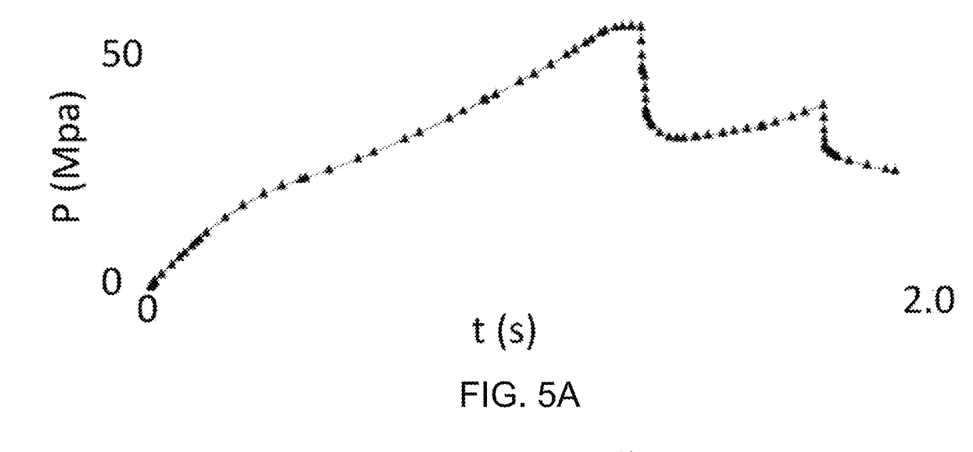
FIG. 5A-5B schematically shows a comparison between an injection moulding apparatus with a prior art gate according to FIG. 1 and an injection moulding apparatus with a gate according to the disclosure.
Figure 5B:
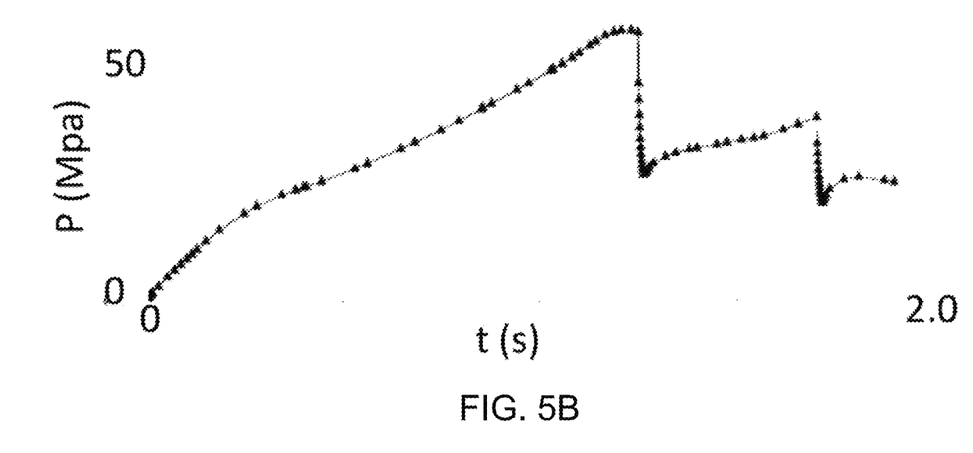

FIGS. 5A and 5B schematically shows a comparison between an injection moulding apparatus 1 with a prior art second gate 6 according to FIG. 1 and an injection moulding apparatus 1 with a second gate 6 according to the disclosure. The comparison relates to the pressure at the nozzle 9 required to fulfill an intended fill time.

The chart in FIG. 5A shows the pressure at the nozzle 9 for a prior art second gate 6, e.g. a gate such as in FIG. 1. For this kind of gate, large pressure drops are generally interpreted as a varying flow front velocity, which is something that one tries to avoid.

The chart in FIG. 5B shows the pressure at the nozzle 9 for a second gate 6 according to the disclosure, e.g. a gate such as in FIG. 2. For this kind of gate, large pressure drops does not indicate a varying flow front velocity as has been demonstrated in for instance FIGS. 2 and 4B.

The final volume of the second gate volume is dependent also on the size of the article to be injection moulded. Simulation software can be beneficial for finding the optimal second gate volume. The sizes mentioned above would in such case provide good starting values for simulations. The size of the runners, e.g. cross sectional area or volume, can also be optimized to add to the effect of the second gate volume.

Although the disclosure has been illustrated and described in detail in the drawings and foregoing description, such illustration and description are to be considered illustrative or exemplary and the disclosure is not limited to the disclosed example embodiments.

What is claimed is:

1. An injection moulding apparatus comprising at least a first mould plate, the first mould plate comprising a first injection inlet arranged in fluid connection with a first gate leading into a mould cavity and a second injection inlet arranged in fluid connection with a second gate leading into the mould cavity, wherein the first injection inlet and the second injection inlet are arranged to open in sequence, with the first injection inlet opening before the second injection inlet, wherein the second gate comprises a first gate volume leading into the mould cavity, wherein the second gate is further provided with a second gate volume allowing injection material to flow into the second gate volume at the same time as into the first gate volume and thereafter into the mould cavity, thereby reducing the velocity of an injection flow in the mould cavity from the second gate;

wherein the second gate volume is provided by a first increased volume extending from the second injection inlet in a first direction; and wherein the second gate comprises a throttle leading into the first increased volume.

2. The injection moulding apparatus according to claim 1, wherein the second gate volume is further provided by a second increased volume extending from the second injection inlet in a second direction different from the first direction.

3. The injection moulding apparatus according to claim 1, wherein the first and/or second increased volume is in the shape of one or more of cuboids, spheroids, parallelepipeds or cylinders.

4. The injection moulding apparatus according to claim 1, wherein the throttle has a cross sectional area between approximately ¼ and ¾ of a cross sectional area of the second gate volume where the throttle connects the first and second gate volumes.

5. The injection moulding apparatus according to claim 1, wherein a size of the second gate volume is a function of the distance between the first injection inlet and the second injection inlet.

6. A method for reducing a velocity increase of a flow front during injection moulding, wherein an injection moulding apparatus comprises at least a first mould plate, the first mould plate comprising a first injection inlet arranged in fluid connection with a first gate leading into a mould cavity and a second injection inlet arranged in fluid connection with a second gate leading into a mould cavity, wherein the first injection inlet and the second injection inlet are arranged to open in sequence, with the first injection inlet opening before the second injection inlet, wherein the second gate comprises a first gate volume leading into the mould cavity, wherein the method comprises:
  providing the second gate with a second gate volume allowing injection material to flow into the second gate volume at the same time as into the first gate volume and thereafter into the mould cavity, thereby reducing the velocity of an injection flow in the mould cavity from the second gate;
  providing the second gate volume by providing a first increased volume extending from the second injection inlet in a first direction; and
  providing the second gate with a throttle leading into the first increased volume.

7. The method according to claim 6, wherein the method comprises:
  providing the second gate volume further by providing a second increased volume extending from the second injection inlet in a second direction different from the first direction.

8. The method according to claim 6, wherein the method comprises:
  providing the first and/or second increased volume with a shape of one or more of cuboids, spheroids, parallelepipeds or cylinders.

* * * * *